US006952197B1

(12) United States Patent
Nakamura et al.

(10) Patent No.: US 6,952,197 B1
(45) Date of Patent: Oct. 4, 2005

(54) POINTING DEVICE

(75) Inventors: Shuji Nakamura, Tokyo (JP); Tamotsu Koike, Tokyo (JP)

(73) Assignee: Fujitsu Component Limited, Tokyo (JP)

( * ) Notice: Subject to any disclaimer, the term of this patent is extended or adjusted under 35 U.S.C. 154(b) by 0 days.

(21) Appl. No.: 09/559,261

(22) Filed: Apr. 27, 2000

(30) Foreign Application Priority Data

Apr. 30, 1999 (JP) ................................. 11-124993

(51) Int. Cl.⁷ ............................................. G09G 5/08
(52) U.S. Cl. ...................... 345/157; 345/160; 345/161; 463/38
(58) Field of Search ............................... 345/156–167; 463/38, 37; 700/85

(56) References Cited

U.S. PATENT DOCUMENTS

| 4,458,114 A | * | 7/1984 | May | ............................ 200/6 A |
| 5,049,863 A | * | 9/1991 | Oka | ............................ 345/163 |
| 5,504,502 A | | 4/1996 | Arita et al. | |
| 5,543,821 A | * | 8/1996 | Marchis et al. | ............. 345/157 |
| 5,615,083 A | * | 3/1997 | Burnett | ....................... 345/161 |
| 5,714,980 A | * | 2/1998 | Niino | .......................... 345/157 |
| 5,793,355 A | * | 8/1998 | Youens | ........................ 345/156 |
| 2002/0018049 A1 | * | 2/2002 | Love | ........................... 345/161 |

FOREIGN PATENT DOCUMENTS

| JP | 04-151719 | * | 5/1992 | ........... G06F 3/033 |
| JP | 6-139013 | | 5/1994 | |
| JP | 10-49292 | | 2/1998 | |
| JP | 2000-106065 | * | 4/2000 | ........... H01H 25/04 |

* cited by examiner

*Primary Examiner*—Alexander Eisen
(74) *Attorney, Agent, or Firm*—Staas & Halsey LLP

(57) ABSTRACT

A pointing device including a base part, an operating part supported on the base part in a rockable manner about a fulcrum, a magnet carried on the operating part, a magneto-electro transducer carried on the base part, and an elastic member arranged between the base part and the operating part to elastically push the operating part toward an initial balanced position on the base part. The elastic member is formed as a plate spring provided with a first section engageable with the base part and a second section engageable with the operating part. The second section is integrally joined to the first section and located to extend around the fulcrum. The first section of the plate spring extends annularly around the fulcrum and is fixedly supported on the base part, and the second section extends arcuately along the first section to exert a spring action.

14 Claims, 11 Drawing Sheets

POINTING DEVICE

BACKGROUND OF THE INVENTION

1. Field of the Invention

The present invention relates to a pointing device which can be suitably provided in a data processor such as a personal computer.

2. Description of the Related Art

In a digital data processor, such as a personal computer, provided with a display and a keyboard incorporated therein, a pointing device is conventionally used as an auxiliary input device for indicating coordinate data on the display by entering analog information through a manual operation by an operator. Particularly, a typical small-sized portable data processor is provided with a built-in type pointing device integrally incorporated in a housing body of the data processor, or otherwise a separate pointing device, such as a mouse, is detachably connected with the processor housing body through a cable and a connector when it is used.

The conventional pointing device, described, e.g., in Japanese Unexamined Patent Publication (Kokai) No. 10-49292 (JP-A-10-49292), includes a base part, an operating part supported on the base part and rockable about a fulcrum provided on the base part, a magnet carried on one of the base part and the operating part, a magneto-electro transducer (generally, a Hall element) carried on the other of the base part and the operating part opposite to the magnet, and an elastic member for pushing or biasing the operating part toward an initial balanced position on the base part. In this pointing device, an operator manually operates the operating part to rock it on the base part against the biasing force of the elastic member, and changes the positional relationship between the magnet and the magneto-electro transducer to vary the output voltage of the magneto-electro transducer, whereby it is possible to enter analog information corresponding to the rocking direction and rocking angle of the operating part.

In the case where the above pointing device having the magneto-electro transducer is integrally incorporated in the housing body of the small-sized data processor, the pointing device is mounted with the operating part thereof being exposed on the upper side portion of the housing body adjacent to the keyboard of the data processor. In this arrangement, the height of the operating part projecting from the upper side of the housing body is reduced as much as possible, in order to ensure the portability of the data processor. Particularly, when it is required to facilitate the reduction of thickness of the data processor, the pointing device is also required in itself to be reduced in the height thereof, i.e., a distance between the bottom surface of the base part and the top surface of the operating part should be decreased as much as possible.

Incidentally, the built-in type pointing device as described above essentially imposes an input operation within a limited area on a operator, and besides, there is a possibility of further deteriorating the operational properties when the height reduction is facilitated. Therefore, in the case where the operator regards the good operational properties of the pointing device as important when using the data processor with a reduced thickness, a detachable type pointing device, in which the dimensions are not related to the dimensions of the data processor, is used. In particular, when the data processor is used in a portable way, it is difficult to ensure a space for operating a mouse having a normal structure, in which an operative ball is partially exposed on the back side of the mouse. Consequently, it has been proposed that a pointing device having a structure similar to that of the conventional built-in type pointing device is used while being detachably attached to the housing body of the data processor (see, e.g., Japanese Unexamined Patent Publication (Kokai) No. 6-139013 (JP-A-6-139013)).

When it is required to reduce the height of the conventional pointing device having the magneto-electro transducer, it is also required to decrease the dimension of the components of the pointing device in a vertical direction, corresponding to height in the assembled state thereof. However, if the dimension in a vertical direction of the elastic member, generally formed by a rubber or a coil spring for biasing the operating part toward the initial position, is excessively reduced, it is possible that a spring force generated when the elastic member is elastically deformed becomes insufficient, which may result in a difficulty in the proper and stable operation of the operating part. Also, if the dimension in a vertical direction of the respective components is decreased, problems may arise wherein the distance between the magnet and the outer surface of the operating part exposed on the upper side of the housing body of the data processor is inevitably reduced, and thereby facilitating magnetic leakage through the operating part to the exterior thereof.

On the other hand, the conventional detachable pointing device, described, e.g., in JP-A-6-139013, includes a housing accommodating both an operating part and a detecting section for detecting the movement of the operating part. When the detachable pointing device is used, a cable extending from the housing is connected through a connector to the data processor, and the housing is mounted at a desired position on the housing body of the data processor. In this arrangement, it is generally troublesome to electrically connect and mechanically attach the pointing device with the data processor, and the cable extending around the data processor from the pointing device mounted thereon may deteriorate the portability and operational environmental condition of the data processor.

SUMMARY OF THE INVENTION

It is therefore an object of the present invention to provide a pointing device having a magneto-electro transducer, in which the entire height of the assembled pointing device is reduced without influencing the operational properties thereof.

Another object of the present invention is to provide a pointing device having a magneto-electro transducer, in which the magnetic leakage through an operating part is decreased even when the height of the pointing device is reduced.

A further object of the present invention is to provide a pointing device capable of being detachably mounted on a data processor, which can easily perform an electrical connection and mechanical attachment to the data processor and can ensure good portability and a good operational environmental condition of the data processor.

In order to accomplish the above objects, the present invention provides a pointing device comprising a base part; an operating part supported on the base part in a rockable manner about a fulcrum; a magnet carried on one of the base part and the operating part; a magneto-electro transducer carried on the other of the base part and the operating part; and an elastic member arranged between the base part and the operating part to elastically push the operating part toward an initial balanced position on the base part, the elastic member being formed as a plate spring provided with a first section engageable with the base part and a second section engageable with the operating part, the second section being integrally joined to the first section and located to extend around the fulcrum.

In this pointing device, it is preferred that the first section of the plate spring extends annularly around the fulcrum and is fixedly supported on the base part, and that the second section extends arcuately along the first section to exert a spring action.

In this arrangement, it is advantageous that the second section of the plate spring includes a distal free end engageable with the operating part and a proximal end integrally joined to the first section at a position remote from the distal free end, and has a length between the distal end and the proximal end for exerting a spring action.

It is also advantageous that the second section of the plate spring includes a distal free end engageable with the operating part and a proximal end integrally joined to the first section at a position close to the distal free end, and has a generally U-shaped length between the distal end and the proximal end for exerting a spring action.

Preferably, the pointing device further comprises a yoke forming a magnetic path, the yoke being arranged in the operating part to at least partially cover the magnet.

In this arrangement, the magnet may be carried on the operating part, and the yoke may be arranged adjacent to the magnet on a side remote from the magneto-electro transducer carried on the base part.

The present invention also provides a pointing device comprising a base part; an operating part supported on the base part in a rockable manner about a fulcrum; a magnet carried on one of the base part and the operating part; a magneto-electro transducer carried on the other of the base part and the operating part; an elastic member arranged between the base part and the operating part to elastically push the operating part toward an initial balanced position on the base part; and a yoke forming a magnetic path, the yoke being arranged in the operating part to at least partially cover the magnet.

The present invention further provides a pointing device comprising a base part; an operating part supported on the base part in a rockable manner about a fulcrum; a magnet carried on one of the base part and the operating part; a magneto-electro transducer carried on the other of the base part and the operating part; an elastic member arranged between the base part and the operating part to elastically push the operating part toward an initial balanced position on the base part; and a connector part arranged adjacent to the base part and the operating part, the connector part being detachably connectable to a data processor and serving to support the base part and the operating part when the connector part is connected to the data processor.

The present invention yet further provides a pointing device comprising an operating part; a detecting part for detecting a movement of the operating part; a connector part arranged adjacent to the operating part and the detecting part, the connector part being detachably connectable to a data processor and serving to support the operating part and the detecting part when the connector part is connected to the data processor.

It is advantageous that this pointing device further comprises a housing for accommodating the operating part and the detecting part, the connecting part being rotatably coupled to the housing.

In this arrangement, the housing may include an engaging section engageable with a housing body of the data processor.

BRIEF DESCRIPTION OF THE DRAWINGS

The above and other objects, features and advantages of the present invention will become more apparent from the following description of preferred embodiments in connection with the accompanying drawings, in which.

DETAILED DESCRIPTION OF THE PREFERRED EMBODIMENTS

Figure 1:
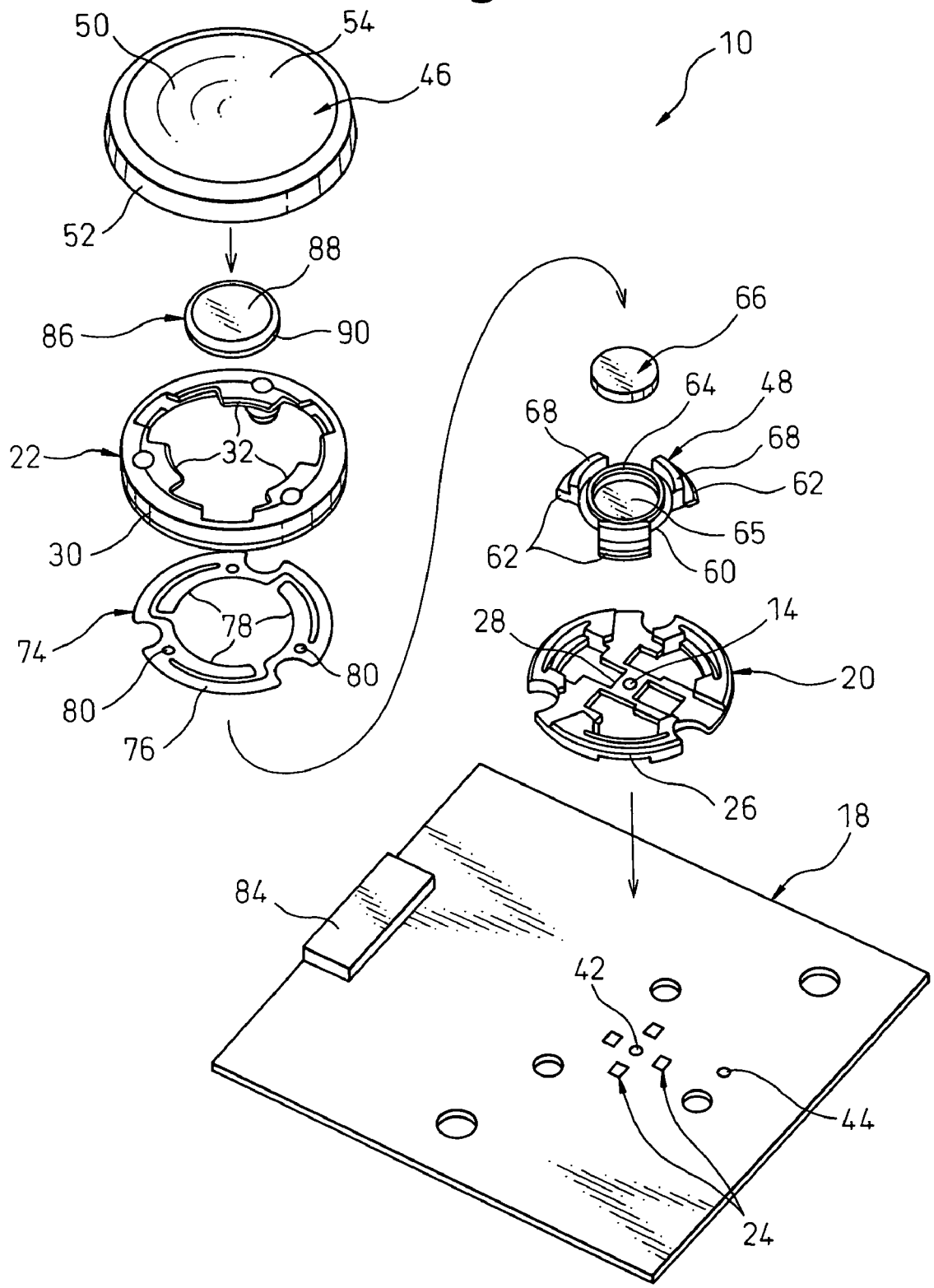
FIG. 1 is an exploded perspective view showing one embodiment of a pointing device according to the present invention.

Referring to the drawings, wherein the same or similar components are denoted by common reference numerals, FIGS. 1 to 4 show a pointing device 10 according to one embodiment of the present invention. The pointing device 10 can be suitably and advantageously used as an auxiliary input device having a reduced height for indicating coordinate data on a display incorporated in a data processor, particularly in a portable small-sized data processor, such as a personal computer, a personal word processor, and so on.

The pointing device 10 includes a base part 12 and an operating part 16 supported on the base part 12 and rockable about a fulcrum 14 provided on the base part 12. The base part 12 includes a circuit board 18 onto which electronical elements, such as a CPU (not shown), are mounted, and first and second frame members 20, 22 fixedly attached in a mutually assembled state to the circuit board 18. A plurality (four, in the illustrated embodiment) of magneto-electro transducers (i.e., Hall elements) 24 are mounted onto the surface of the circuit board 18 at predetermined positions. The magneto-electro transducers 24 are positioned inside the assembled frame members 20, 22.

The first frame member 20 has a thin-plate shape, and includes a generally annular outer circumferential portion 26 and a central portion 28 extending inside the outer circumferential portion 26 to be integrally joined to the latter. The central portion 28 is provided with a hemispheric depression which constitutes the fulcrum 14. The second frame member 22 includes a generally cylindrical circumferential wall portion 30 and a plurality (three, in the illustrated embodiment) of flange portions 32 extending locally and radially inside the circumferential wall portion 30 to be integrally joined to the latter. The circumferential wall portion 30 and the flange portions 32 define a recess for accommodating the first frame member 20. The outer circumferential portion 26 of the first frame member 20 is provided at predetermined positions on the outer side of the circumferential portion 26 with detents 34 facing outward. The circumferential wall portion 30 of the second frame member 22 is provided at predetermined positions on the inner side of the wall portion 30 with detents 36 facing inward and capable of engaging with the detents 34. The first and second frame members 20, 22 are fixedly assembled together when the detents 34, 36 thereof are engaged with each other with a snap action, i.e., under the elastic deformation of one or both of the detents 34, 36 or of the frame members 20, 22.

The first frame member 20 is also provided on the back side of the central portion 28 opposite to the depression for the fulcrum 14 with one projection 38, and on the corresponding side of the outer circumferential portion 26 with one projection 40. The projections 38, 40 are fitted respectively into locating holes 42, 44 provided on the surface of the circuit board 18, so that the mutually assembled first and second frame members 20, 22 are located at a predetermined position on the circuit board 18. In this state, the magneto-electro transducers 24 mounted on the circuit board 18 are located in respective openings defined between the outer circumferential portion 26 and the central portion 28 of the first frame member 20 and are arranged in a distributed manner in a circumferential direction about the fulcrum 14. The second frame member 22 is secured to the circuit board 18 by a bolt (not shown).

The operating part 16 includes a cover 46 which an operator touches, and a holder 48 securely assembled to the cover 46. The cover 46 includes a generally disk-shaped end wall portion 50 and a generally cylindrical circumferential wall portion 52 extending axially from an outer edge of the end wall portion 50 to be integrally joined to the latter. The end wall portion 50 and the circumferential wall portion 52 define a recess for accommodating the second frame member 22 of the base part 12. The end wall portion 50 of the cover 46 is provided on the outer side of the end wall portion 50 with an operating surface 54 concavely and smoothly curved in an ergonomic manner. The end wall portion 50 of the cover 46 is also provided on the inner side thereof with a plurality (three, in the illustrated embodiment) of engaging pieces 58 projecting from the inner side and respectively having detents 56 facing inward. The engaging pieces 58 are spaced from the circumferential wall portion 52 and arranged concentrically with the latter.

The holder 48 includes a generally disk-shaped bottom wall portion 60 and a plurality (three, in the illustrated embodiment) of flange portions 62 extending locally and radially outward from the outer edge of the bottom wall portion 60 to be integrally joined to the latter. The bottom wall portion 60 of the holder 48 is provided with a cylindrical wall 64 projecting from the upper side of the bottom wall portion 60. A magnet 66 generally having a disk shape is received in a recess 65 defined by the bottom wall portion 60 and the cylindrical wall 64. The flange portions 62 of the holder 48 are disposed at generally regular intervals in the circumferential direction of the bottom wall portion 60. Supplemental walls 68 extending generally parallel to the cylindrical wall 64 are respectively formed between the bottom wall portion 60 and the flange portions 62. The bottom wall portion 60 is also provided with detents 70 facing outward, respectively, on the outer peripheral regions of the wall portion 60, in which no flange portion 62 is formed. The cover 46 and the holder 48 are fixedly assembled together when the detents 56 on the engaging pieces 58 of the cover 46 are respectively engaged with the detents 70 of the holder 48 with a snap action. In this state, each of the supplemental walls 68 of the holder 48 is located between two engaging pieces 58 of the cover 46 arranged side-by-side in a circumferential direction.

The bottom wall portion 60 of the holder 48 is provided with a generally conical back side opposite to the upper side having the cylindrical wall 64, the conical back side convexly extending from the outer periphery to the center of the bottom wall portion 60, so as to form a generally hemispherical bulge 72 at the vertex of the conical back side. When the operating part 16 is assembled to the base part 12, the holder 48 is inserted within the circumferential wall portion 30 of the second frame member 22 of the base part 12 while keeping such a positional relationship that the flange portions 62 of the holder 48 are laterally shifted relative to the flange portions 32 of the second frame member 22. Simultaneously, the second frame member 22 is received into the recess defined between the end and circumferential wall portions 50, 52 of the cover 46 secured to the holder 48, and the bulge 72 of the holder 48 is slidably received and closely fitted into the depression for the fulcrum 14 provided on the central portion 28 of the first frame member 20. In this manner, the holder 48 is supported together or integrally with the cover 46 and the magnet 66 on the first frame member 20 and is rockable, in every direction, about the fulcrum 14. In this state, the magnet 66 is located facing the magneto-electro transducers 24 provided on the circuit board 18 and is spaced from the transducers 24 at a predetermined distance.

Figure 2:
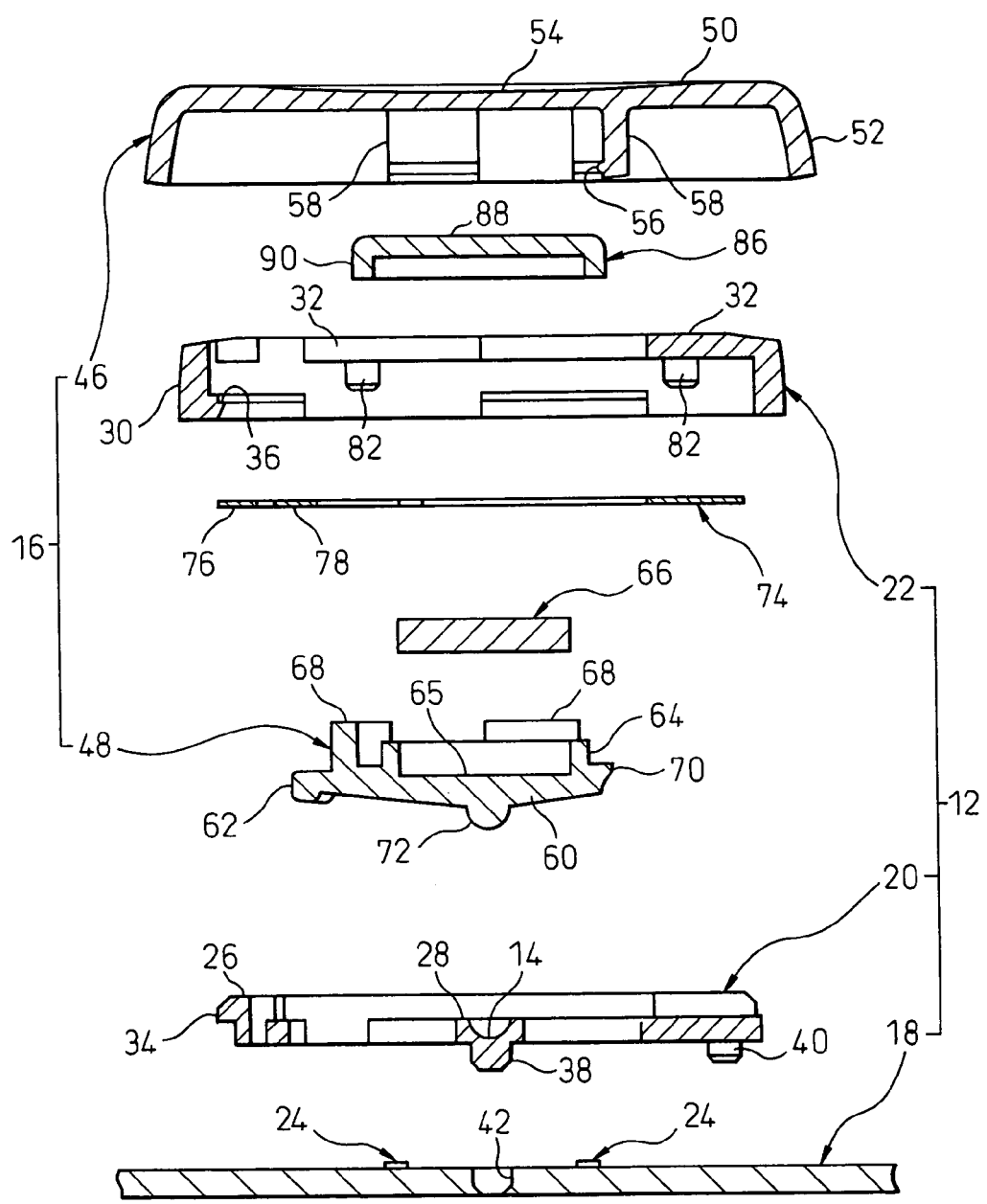
FIG. 2 is an exploded vertical sectional view showing the pointing device of FIG. 1.
Figure 3:
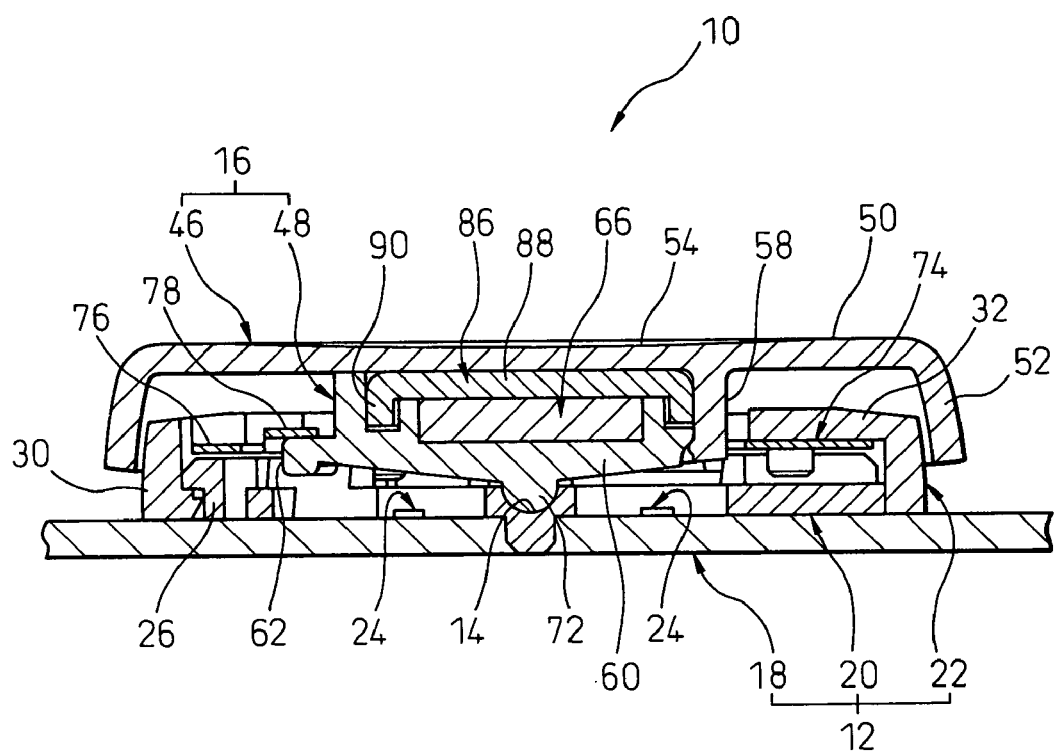
FIG. 3 is a vertical sectional view showing the pointing device of FIG. 1 in an assembled state.
Figure 4A:
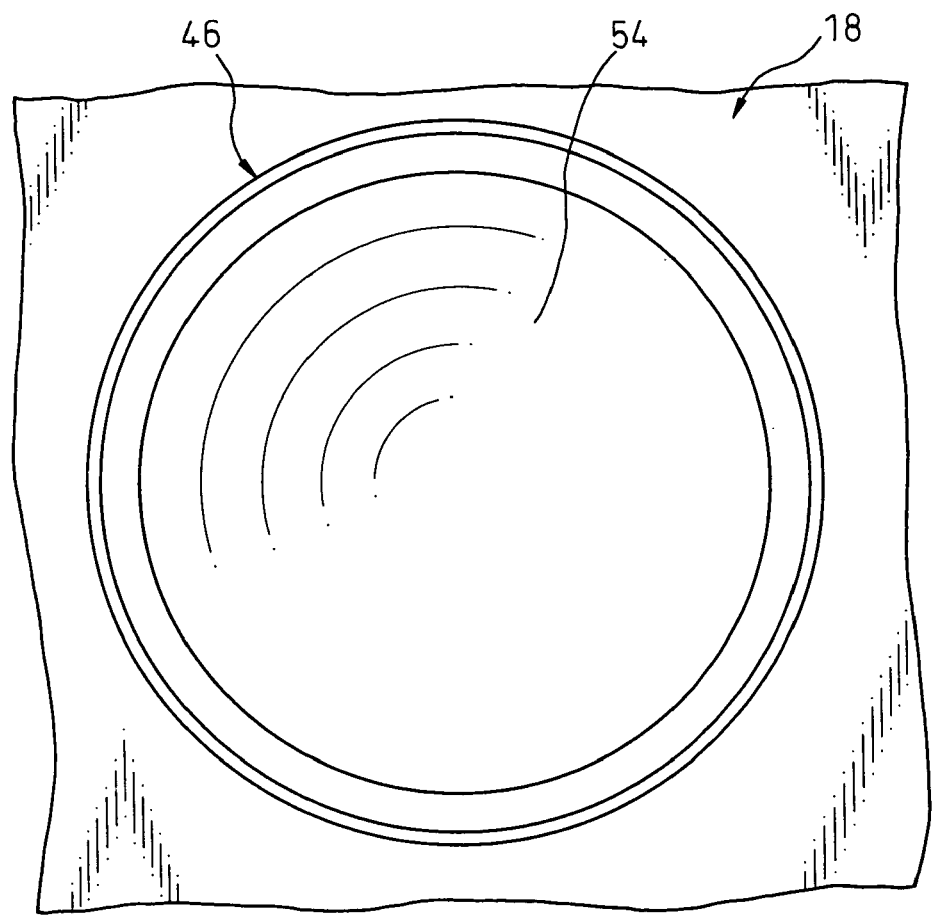
FIG. 4A is a plan view of the pointing device of FIG. 1.
Figure 4B:
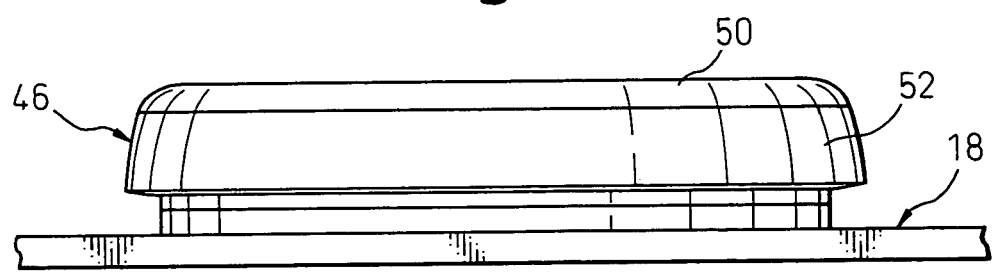
FIG. 4B is a front view of the pointing device of FIG. 1.

The pointing device 10 also includes a plate spring 74 acting as an elastic member for biasing or urging the operating part 16 toward an initial balanced position on the base part 12. The plate spring 74 includes a first section 76 capable of being engaged with the base part 12, and a plurality (three, in the illustrated embodiment) of second sections 78 integrally extending from the first section 76 and capable of being engaged with the operating part 16. The plate spring 74 has a plate-like shape and may be made, e.g., through a blanking process from a spring steel. The first section 76 of the plate spring 74 extends around the fulcrum 14 in a generally circular and annular shape, and is fixedly supported between the first and second frame members 20, 22 of the base part 12. The second sections 78 of the plate spring 74 arcuately extend along and inside the first section 76 from the plural points of the first section 76 defined at regular intervals in the circumferential direction, and are respectively supported at the free ends thereof on the flange portions 62 of the holder 48 of the operating part 16. The first and second sections 76, 78 of the plate spring 74 are maintained generally flush with each other during an unloaded state, as shown in FIGS. 1 and 2. When an external force is applied to each of the second sections 78, each second section 78 is elastically deformed so as to exert a spring action against the external force.

The plate spring 74 is also provided with through holes 80, each of which is formed near the proximal end of each second section 78, i.e., in a connecting area between each second section 78 and the first section 76. The second frame member 22 of the base part 12 is also provided with locating protrusions 82 disposed correspondingly to the through holes 80, each protrusion 82 being formed on the inner side of each flange portion 32. The first section 76 of the plate spring 74 is held between the outer circumferential portion 26 of the first frame member 20 and the flange portions 32 of the second frame member 22, with the protrusions 82 of the second frame member 22 being respectively inserted into the through holes 80 of the first frame member 20, and thereby the plate spring 74 is incorporated within the base part 12.

When the operating part 16 is incorporated with the base part 12 in a manner as described, each second section 78 of the plate spring 74 is engaged at the free end thereof with the upper surface, facing away from the circuit board 18, of each flange portion 62 of the holder 48. In this connection, the respective components are sized and configured so that all of the second sections 78 are evenly loaded by the corresponding flange portions 62 to be elastically deformed and bent slightly upward (see FIG. 3). As a result, the second sections 78 of the plate spring 74 exert a generally even spring force onto the respective flange portions 62 of the holder 48 in a downward direction toward the circuit board 18. Under such a balanced spring force, the operating part 16 formed from the cover 46 and the holder 48 is stably and elastically held in an initial balanced position together or integrally with the magnet 66. In the initial position, the end wall portion 50 of the cover 46 is disposed generally parallel to the circuit board 18, and the magneto-electro transducers 24 on the circuit board 18 are positioned at generally equal distance from the magnet 66 on the operating part 16.

Figure 5A:
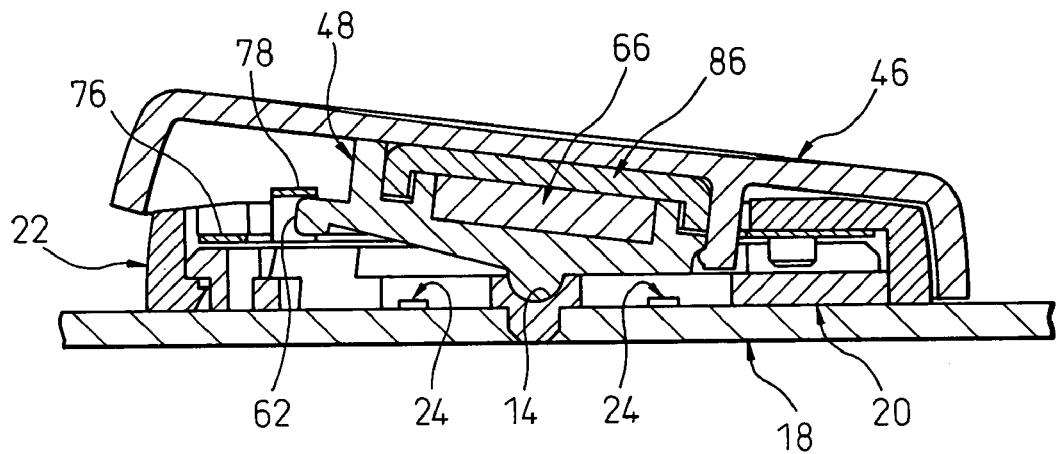
FIG. 5A is a vertical sectional view showing the pointing device of FIG. 1 in one operationally tilted position.
Figure 5B:
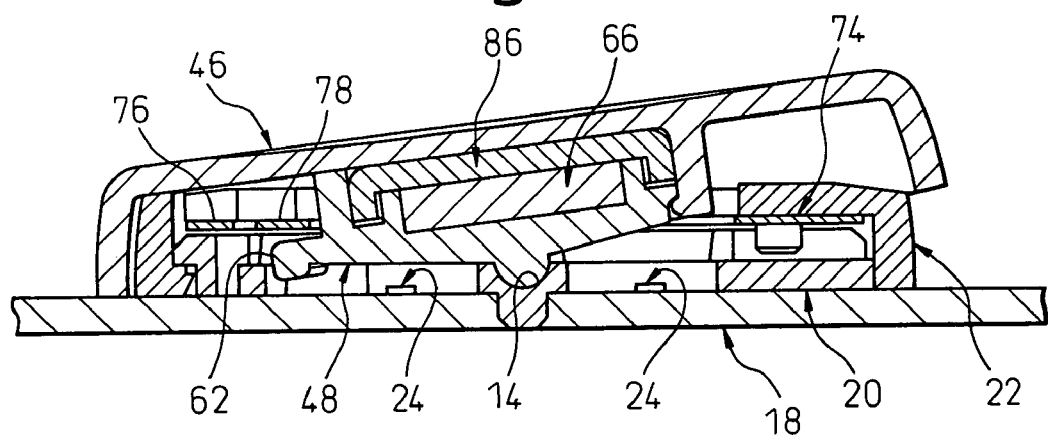
FIG. 5B is a vertical sectional view showing the pointing device of FIG. 1 in another operationally tilted position.

In the operation of the pointing device 10, an operator manipulates, by his finger, the cover 46 of the operating part 16, to have the operating part 16 rock about the fulcrum 14 on the base part 12 against the biasing force of the plate spring 74. As a result, as shown in FIGS. 5A and 5B, the relative positional relationship between the magnet 66 and each magneto-electro transducer 24 is varied, corresponding to the rocking direction and angle of the cover 46, and thereby the magneto-electro transducers 24 respectively output voltages different from each other. The fluctuation of the output voltage of each magneto-electro transducer 24 due to the rocking motion of the cover 46 is processed as an analogue information in the CPU (not shown) to be converted into digital coordinate data, which in turn is output through a connector 84 (FIG. 1) provided on the circuit board 18 to a processing mechanism in a data processor (not shown). In this manner, it is possible, for example, to shift a character or cursor on a display of the data processor in a desired direction and over a desired distance, corresponding to the rocking direction and angle of the cover 46 of the operating part 16.

As shown in FIGS. 5A and 5B, when the cover 46 is rocked from the initial position toward the desired direction, the second sections 78 of the plate spring 74 change the elastic deformations thereof from a balanced mode into an unbalanced mode corresponding to the rocking direction of the cover 46, due to the rocking motion of the flange portions 62 of the holder 48. Therefore, the operating part 16 is continuously biased or pushed toward the initial balanced position by the spring force, due to the elastically deformed second sections 78 of the plate spring 74, which tends to recover the balanced mode thereof. Consequently, the operating part 16 can smoothly rock while properly corresponding to an operator's finger action, and can readily return to the initial position at substantially the same time as the operator releases the cover 46 from his finger.

As described above, the pointing device 10 incorporates therein a plate spring 74 having a thin-plate shape as an elastic member for biasing the operating part 16 toward the initial position, so that the height or vertical dimension of the pointing device 10 in an assembled state can be easily reduced. The plate spring 74 includes the second sections 78 extending in an arcuate shape around the fulcrum 14 along the first section 76, whereby a spring force necessary and sufficient for a stable manipulation of the operating part 16 can be exerted from each second section 78 extending into a desired length in a circumferential direction, in spite of the significantly small height of the plate spring 74. Accordingly, the pointing device 10 can reduce the entire height or vertical dimension thereof in the assembled state without deteriorating the operational properties of the operating part 16, and thus can facilitate the reduction of thickness of a data processor in the case where the pointing device 10 is integrally incorporated, for use, in the housing body of the data processor.

Figure 6:
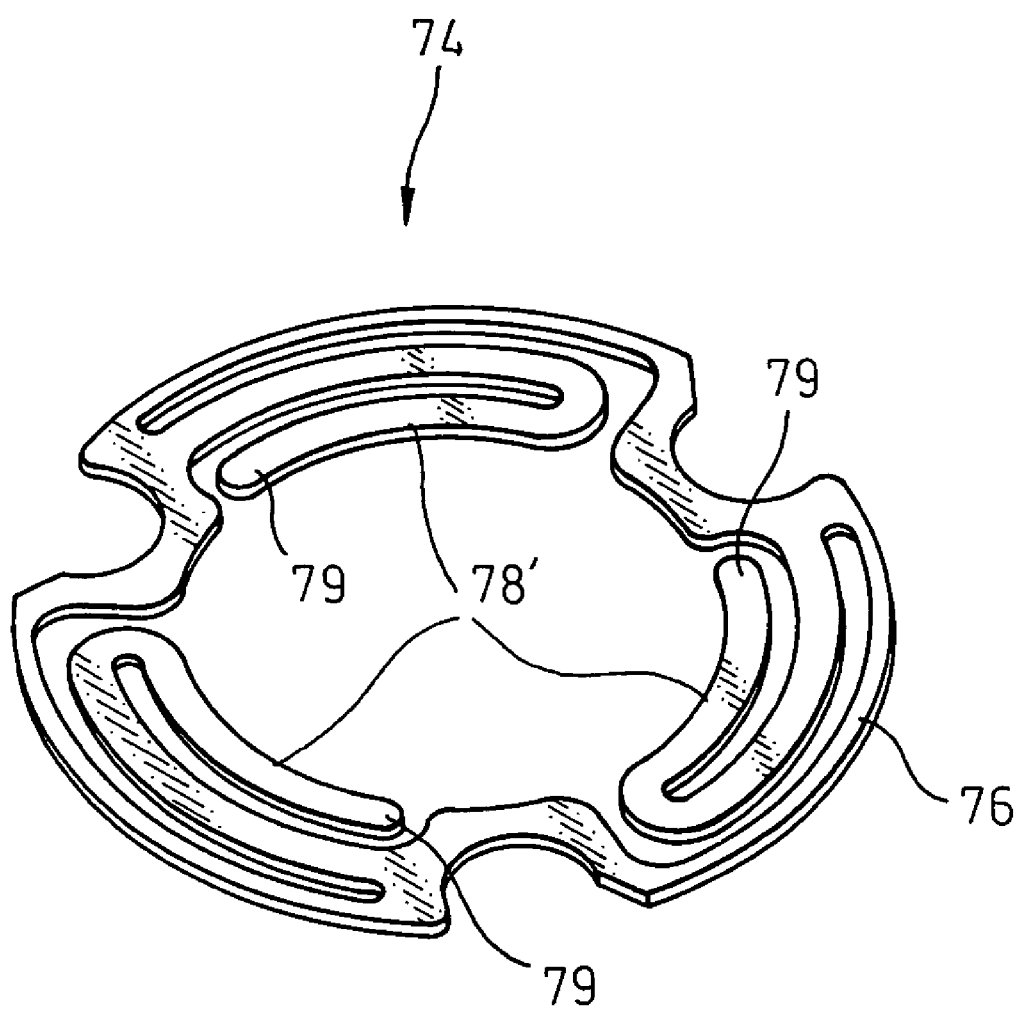
FIG. 6 is a perspective view of a modification of a plate spring.
Figure 7:
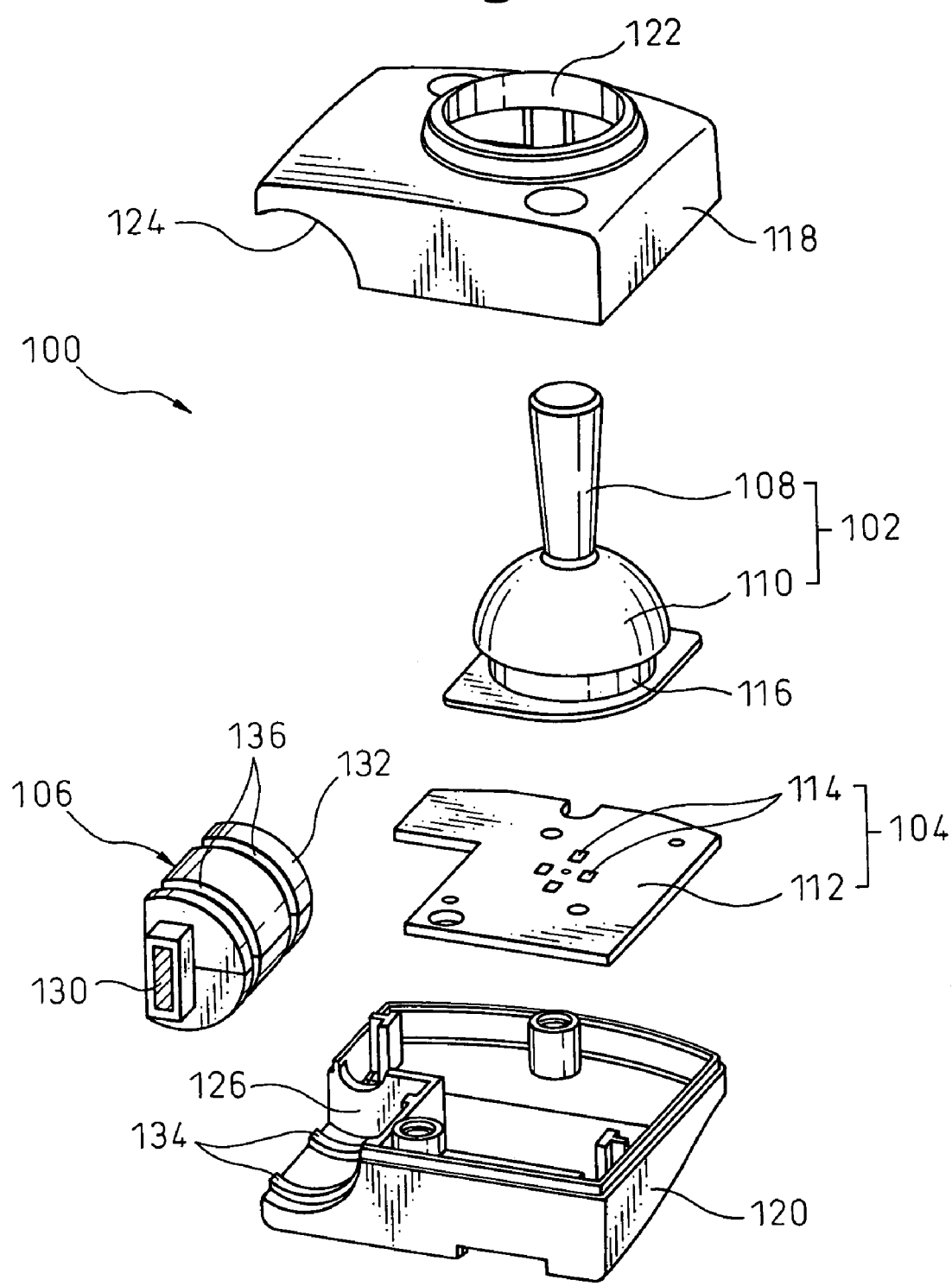
FIG. 7 is an exploded perspective view showing another embodiment of a pointing device according to the present invention.
Figure 8:
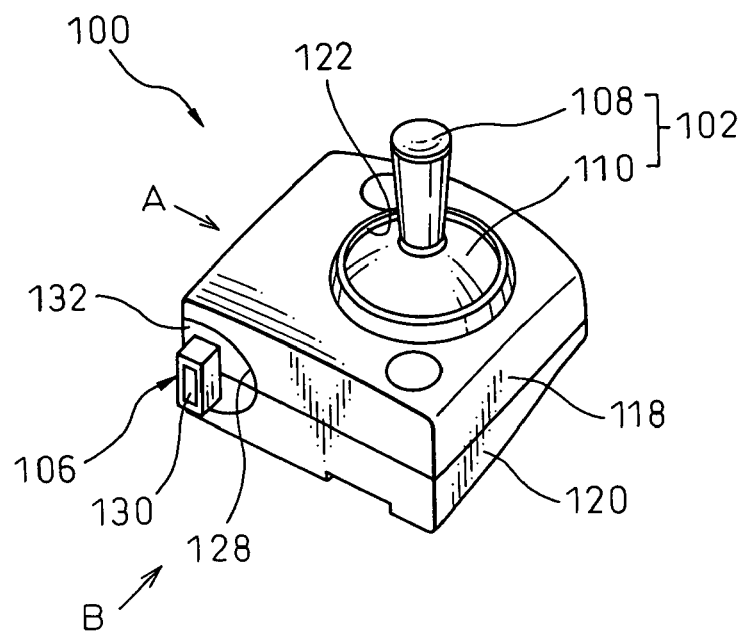
FIG. 8 is a perspective view showing the pointing device of FIG. 7 in an assembled state.
Figure 9A:
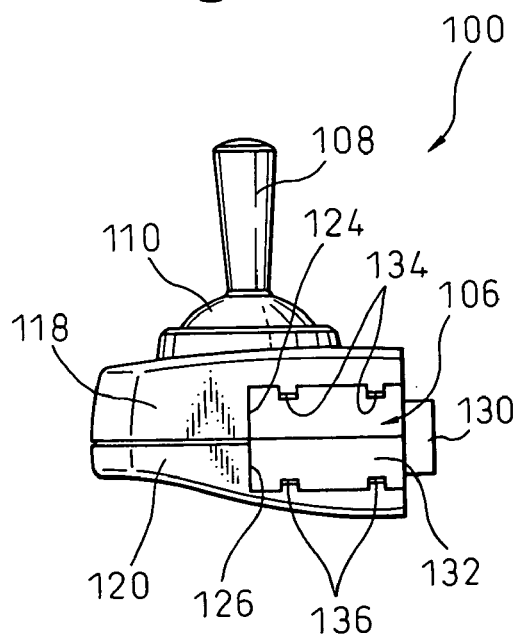
FIG. 9A is a side view of the pointing device of FIG. 7, as seen from an arrow A of FIG. 8.
Figure 9B:
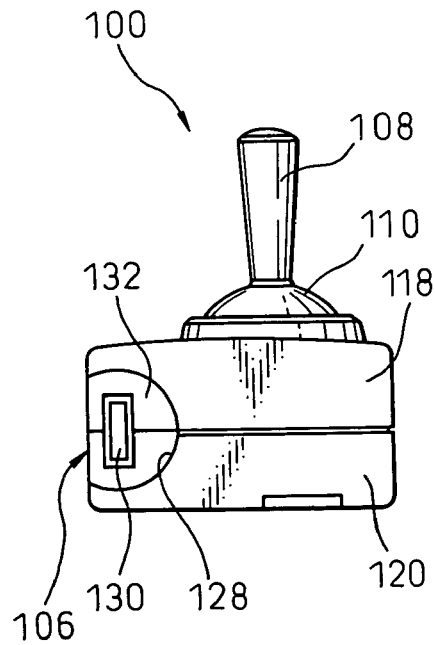
FIG. 9B is a side view of the pointing device of FIG. 7, as seen from an arrow B of FIG. 8.
Figure 10A:
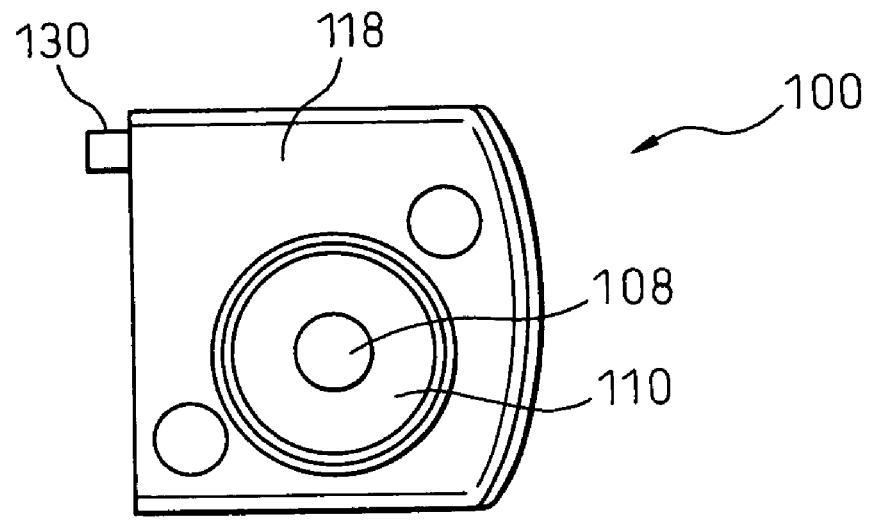
FIG. 10A is a top plan view of the pointing device of FIG. 7.
Figure 10B:
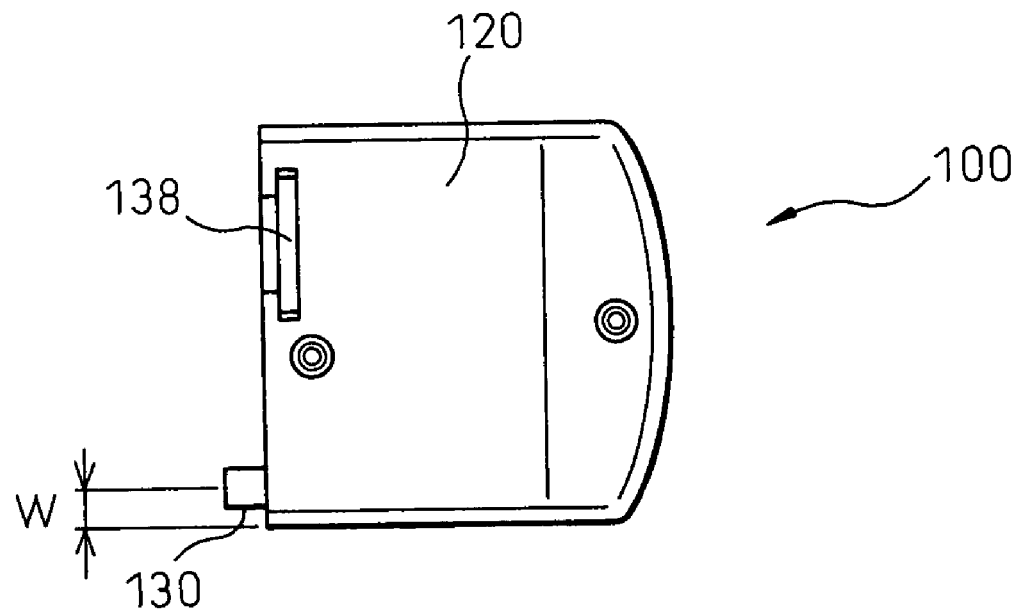
FIG. 10B is a bottom plan view of the pointing device of FIG. 7.

It should be appreciated that the plate spring 74 of the pointing device 10 may have various shapes and dimensions other than the above described configuration. As shown in FIG. 6, for example, the adaptable plate spring 74 may include second sections 78', each of which extends in a generally U-shape from the proximal end thereof joined to the first section 76. In this arrangement, each second section 78' is engaged at the distal free end 79 thereof with the flange portion 62 of the holder 48. This modification makes it possible to easily increase the whole length of the second section 78' for exerting a spring action, and thus to obtain a larger spring force.

The plate spring 74 described in connection with the above embodiment may also be effectively used in another pointing device in which a magnet and magneto-electro transducers are arranged opposite to the above embodiment, that is, in which magneto-electro transducers provided in a operating part are moved relative to a magnet provided in a base part, within the scope of the present invention. In this arrangement, the above-described effects are also obtainable.

The pointing device 10 further includes a yoke 86 placed in the operating part 16 above the magnet 66 to constitute a magnetic path. The yoke 86 has a dish-like configuration which may be made through a drawing process from a metal plate such as a magnetic steel plate, and includes a generally circular end wall portion 88 and a generally cylindrical circumferential wall portion 90 extending axially from the outer periphery of the end wall portion 88 and integrally joined to the latter. The circumferential wall portion 90 of the yoke 86 is received between the cylindrical wall 64 and the supplemental walls 68 of the holder 48, and thereby the yoke 86 is attached to the holder 48 accommodating the magnet 66 in the recess 65. In this attached state, the end wall portion 88 of the yoke 86 is located close to the magnet 66 on the side remote from the magneto-electro transducers 24. The yoke 86 constitutes a magnetic circuit generated by the magnet 66 along the end wall portion 88 and the circumferential wall portion 90, and thereby serves to minimize a magnetic leakage through the cover 46 to the exterior thereof and to direct a magnetic field toward the magneto-electro transducers 24 on the circuit board 18. Accordingly, the magnetic leakage through the operating part 16 to the exterior thereof can be decreased as much as possible, even in the pointing device 10 of which the height is reduced due to the above-described effects of the plate spring 74.

The yoke 86 described in connection with the above embodiment using the plate spring as an elastic member may also be effectively used in a pointing device using the other elastic member, such as a rubber, a coil spring, and so on, within the scope of the present invention, as long as the magneto-electro transducers are incorporated in the pointing device. In this arrangement, the above-described effects are also obtainable.

The pointing device 10 according to the above embodiment is structured to realize the height reduction thereof while solving the problems of the deterioration of operating properties and of the magnetic leakage, and thus can be effectively used, in particular, as a built-in type pointing device adapted to be integrally incorporated in the housing body of a low-height portable data processor. However, there is a case where an operator wishes to use a detachable type pointing device adapted to be detachably connected to a data processor. FIGS. 7 to 10B show such a detachable type pointing device 100 according to another embodiment of the present invention.

The pointing device 100 includes an operating part 102, a detecting part 104 for detecting the movement of the operating part 102, and a connector part 106 disposed adjacent to the operating part 102 and the detecting part 104. The pointing device 100 is detachably mounted to a data processor through the connector part 106 as described later. The operating part 102 shown in the assembled state has a construction substantially identical to that of the operating part 16 of the pointing device 10, except that the dish-shaped cover 46 is replaced by a dome member 110 provided with a stick 108. Therefore, the illustration and description of the internal structure of the operating part 102 are not repeated.

The detecting part 104 includes a circuit board 112 on which electronic elements such as a CPU (not shown) are mounted, and a plurality of magneto-electro transducers 114 mounted on the circuit board 112 at a predetermined position. The circuit board 112 and the magneto-electro transducers 114 are structured substantially identically to the circuit board 18 and the magneto-electro transducers 24 of the pointing device 10 of the first embodiment, and thus the description thereof is not repeated. The dome member 110 is supported in a rockable manner about a fulcrum (not shown) on a frame 116 secured to the circuit board 112. The frame 116 corresponds to the first and second frame members 20, 22 of the pointing device 10.

As described above, the pointing device 100 may have a basic structure substantially identical to that of the pointing device 10. In this respect, because the pointing device 100 having a detachable structure is not so limited in the dimension thereof, the pointing device 100 may include another type of elastic member, such as a rubber, a coil spring, and so on, in place of the plate spring 74 described above.

The pointing device 100 also includes a pair of upper and lower housings 118, 120 for accommodating the operating part 102 and the detecting part 104. When the housings 118, 120 are assembled together, the circuit board 112 on which the frame 116 is secured is fixedly supported therein, and a part of the dome member 110 including the stick 108 is exposed to project outward through an opening 122 provided in the upper housing 118. The housings 118, 120 are provided in the outer surfaces thereof with recesses 124, 126, respectively, both of which include cylindrical curved surface sections. The recesses 124, 126 define a receptacle 128 for receiving the connector part 106 by mutually smoothly joining the curved surface sections thereof when the housings 118, 120 are assembled together. The receptacle 128 has an arcuate sectional shape larger than a semicircle, as illustrated.

The connector part 106 includes a connector 130 having, by way of example, a rectangular connecting section meeting a USB (Universal Serial Bus) standard, a casing 132 for securely accommodating the connector 130 with the connecting section being exposed. The connector 130 is connected through a cable or lead (not shown) to the circuit board 112 of the detecting part 104. The casing 132 is a drum-shaped assembled component having a generally arcuate sectional shape corresponding to the shape of the receptacle 128 defined between the housings 118, 120, and is received in the receptacle 128 while the cylindrical outer surface portion of the casing 132 is opposed to or brought into contact with the cylindrical curved surface sections of the recesses 124, 126.

The receptacle 128 defined between the housings 118, 120 is provided with a pair of ribs 134 extending parallel to each other in a circumferential direction on the curved surface sections of the recesses 124, 126. Correspondingly, the casing 132 of the connector part 106 is provided with a pair of grooves 136 extending parallel to each other in a circumferential direction on the cylindrical outer surface portion of the casing 132. The connector part 106 is received in the receptacle 128 in such a condition where the ribs 134 of the receptacle 128 in the housings 118, 120 are respectively fitted into the outside grooves 136 of the casing 132. The connector part 106 is thus coupled to the housings 118, 120 in a rotatable manner along the ribs 134 in the receptacle 128, so as not to fall out of the receptacle 128.

Figure 11A:
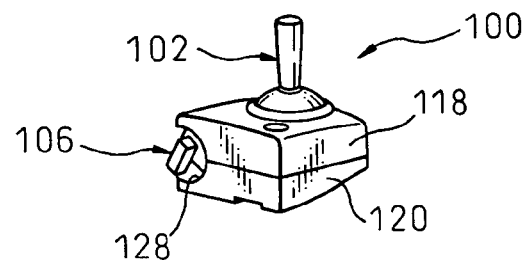
FIG. 11A is a perspective view of the pointing device of FIG. 7.
Figure 11B:
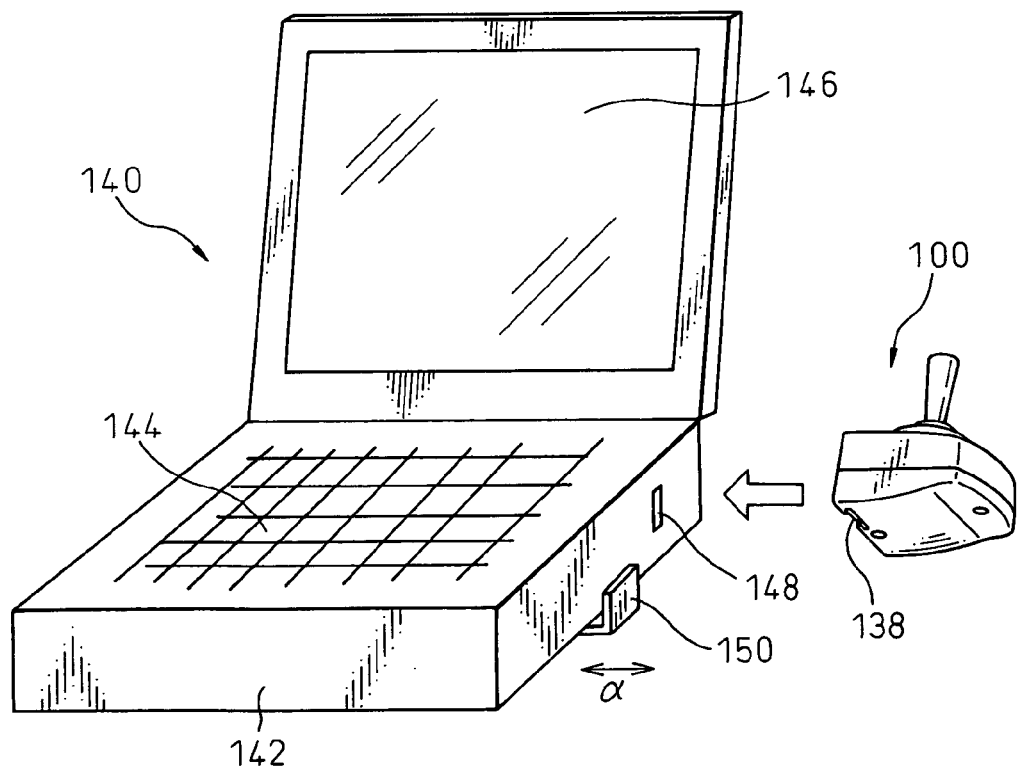
FIG. 11B is a perspective view of a data processor in a condition before the pointing device of FIG. 7 is attached thereto.
Figure 12:
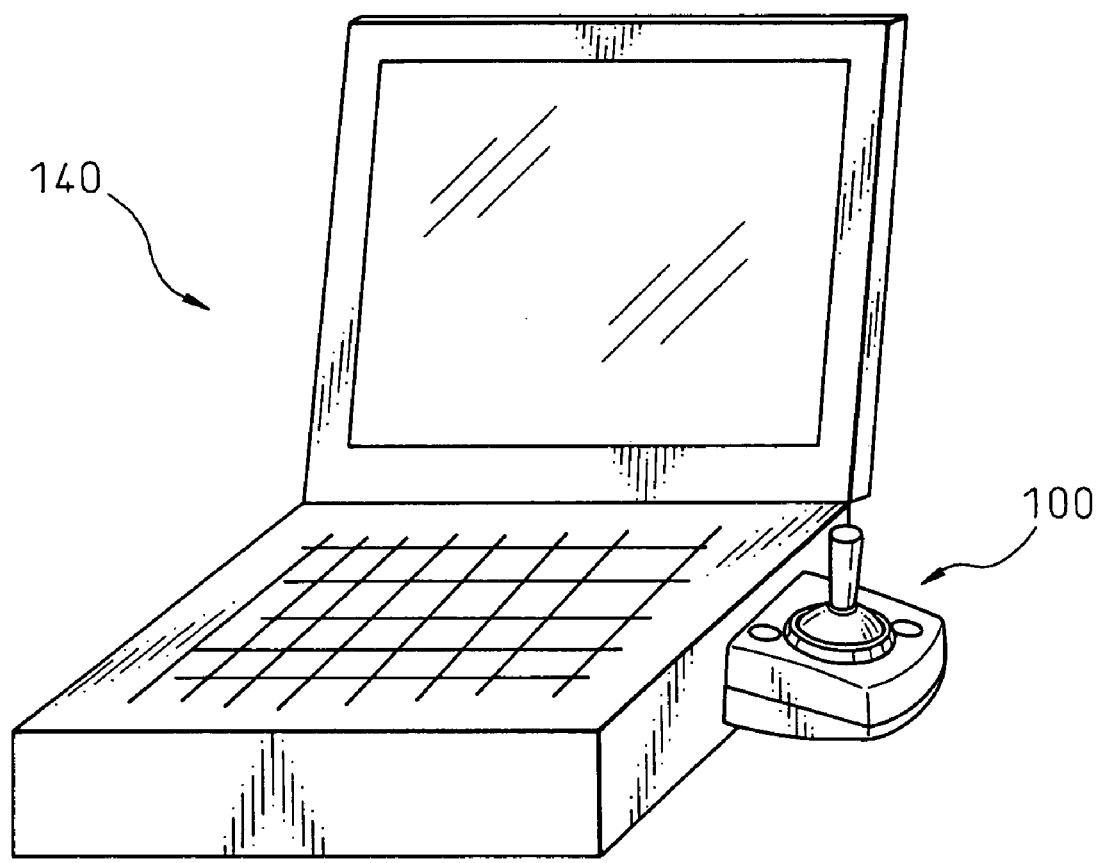
FIG. 12 is a perspective view of the data processor of FIG. 11B to which the pointing device is attached.

As shown in FIGS. 11A to 12, the pointing device 100 is detachably installed for use on the housing body 142 of a data processor 140, such as a personal computer, a personal word processor, and so on. The data processor 140 is illustrated as portable equipment including a keyboard 144 and a display 146 in an integrated manner, and is provided at a predetermined position on the lateral surface of the housing body 142 accommodating the keyboard 144 with an interface part 148 to which the connector part 106 of the pointing device 100 is connected.

The pointing device 100 is detachably mounted on the data processor 140 through the connector part 106 and interface part 148 directly connected with each other, and, during this mounted condition, the connector part 106 serves to carry the housings 118, 120 accommodating the operating part 102 and the detecting part 104 therein. According to this structure, it is possible to complete both the electrical connection and the mechanical attachment of the pointing device 100 to the data processor 140 by simply connecting the connector part 106 with the interface part 148, and thereby to readily or rapidly perform the attachment/detachment of the pointing device 100. Also, in the pointing device 100, the connector part 106 is previously incorporated in and integrated with the housings 118, 120, so that it is possible to eliminate a cable for connecting the pointing device 100 to the data processor 140, such a cable being used for a conventional detachable pointing device and extending around a data processor during the mounted condition of the pointing device. Therefore, good portability and a good operational environmental condition of the data processor 140 can be maintained.

In the case where the connector 130 of the connector part 106 meets the USB standard, it is preferred that the distance w (FIG. 10B) between the center of the connecting section of the connector 130 and the generally flat end surface of the casing 132 is 4.25 mm or less. According to this arrangement, it is possible to connect a connector of another peripheral device, which also meets the USB standard, with the data processor 140 in a side-by-side arrangement of the pointing device 100 and the other peripheral device.

The pointing device 100 may further include an engaging section 138 capable of being engaged with the housing body 142 of the data processor 140. The engaging section 138 is formed as a slit recessed in the bottom surface of the lower housing 120 of the pointing device 100. Correspondingly, the housing body 142 of the data processor 140 may be provided with a support section 150 adapted to be detachably engaged with the engaging section 138 of the pointing device 100 to support the lower housing 120. In this case, the support section 150 may be formed as a plate-like element capable of being received in the engaging section 138 as a slit. In order to maintain the good portability and operational environmental condition of the data processor 140, it is preferred that the support section 150 is movable in a direction shown by an arrow a (FIG. 11B) between a retracted position where the support section 150 is close to the lateral surface of the housing body 142 and a projecting position where the support section 150 projects from the lateral surface of the housing body 142.

When the pointing device 100 is mounted on the data processor 140, it is also preferred that the connector part 106 is connected to the interface part 148 in a position suitably rotated in the receptacle 128 as shown FIG. 11A, so as to eliminate the interference between the housings 118, 120 of the pointing device 100 and the support section 150 on the housing body 142, which may be caused by the location of the interface part 148 on the housing body 142. Then, the support section 150 is shifted to the projecting position, and the housings 118, 120 are rotated relative to the connector part 106 so as to receive the support section 150 in the engaging section 138. In this manner, the mounting work of the pointing device 100 is completed (FIG. 12).

The connector part 106 described in connection with the pointing device 100 with the magneto-electro transducers 114 according to the above embodiment may also be effectively used in the other types of pointing devices, such as a pointing device with a rotary ball which is manually rotated so as to input the rotating direction and angle of the ball, or a pointing device with a flat sheet which is touched and rubbed with a finger so as to input the shifting direction and distance of a touched point on the sheet. In every arrangement, the above-described effects are also obtainable.

While the invention has been particularly shown and described with reference to preferred embodiments thereof, it will be understood by those skilled in the art that various changes and modifications may be made without departing from the spirit and scope of the following claims.

What is claimed is:

1. A pointing device comprising:
   a base part;
   an operating part supported on said base part in a rockable manner about a fulcrum;
   a magnet carried on one of said base part and said operating part;
   a magneto-electro transducer carried on the other of said base part and said operating part; and
   an elastic member arranged between said base part and said operating part to elastically push said operating part toward an initial balanced position on said base part, said elastic member being formed as a plate spring provided with an opening to receive the fulcrum therethrough, a first section of said elastic member being engageable with said base part and a second section of said elastic member being engageable with said operating part, said second section being integrally joined to said first section and located to extend around said fulcrum,
   wherein said first section extends annularly around said fulcrum and is fixedly supported on said base part, and said second section is a plurality of concentric, elongated members, each of which extends arcuately along said first section to exert a spring action, and an opening is formed between the first section and each of the plurality of elongated members, and
   wherein each of said plurality of elongated members of said second section includes—
   a distal free end engageable with said operating part and a proximal end integrally joined to said first section at a position remote from said distal free end, and has a length between said distal end and said proximal end for exerting the spring action, or
   a distal free end engageable with said operating part and a proximal end integrally joined to said first section at a position close to said distal free end, and has a generally U-shaped length between said distal end and said proximal end for exerting the spring action.

2. A pointing device comprising:
   a base part;
   an operating part supported on said base part in a rockable manner about a fulcrum;
   a magnet having a first width and being carried on one of said base part and said operating part;
   a magneto-electro transducer carried on the other of said base part and said operating part;
   an elastic member arranged between said base part and said operating part to elastically push said operating part toward an initial balanced position on said base part; and
   a yoke, separate from the magnet, having a width greater than the magnet, and, forming a magnetic path, said yoke being arranged in said operating part to at least partially cover said magnet,
   wherein said yoke minimizes magnetic leakage through the operating part to an exterior thereof, and directs a magnetic field toward the magneto-electro transducer.

3. A pointing device comprising:
   a base part;
   an operating part supported on said base part in a rockable manner about a fulcrum;
   a magnet carried on one of said base part and said operating part;
   a magneto-electro transducer carried on the other of said base part and said operating part;
   an elastic member arranged between said base part and said operating part to elastically push said operating part toward an initial balanced position on said base part; and
   a connector part arranged adjacent to said base part and said operating part, said connector part being detachably connectable to a data processor and serving to electrically and mechanically support, in a rotatable manner, said base part and said operating part relative to the data processor as an exclusive support for the pointing device, when said connector part is connected to the data processor.

4. A pointing device as set forth in claim 3,
   wherein said detecting part includes a magneto-electro transducer, wherein said magnet is received by said operating part, and wherein said yoke is arranged adjacent to said magnet on a side remote from said magneto-electro transducer.

5. A pointing device as set forth in claim 3, wherein said yoke is separate from the magnet, has a width greater than the magnet, and is arranged in said operating part to at least partially cover said magnet.

6. A pointing device comprising:
an operating part;
a detecting part for detecting a movement of said operating part;
a connector part arranged adjacent to said operating part and said detecting part, said connector part being detachably connectable to a data processor and serving to electrically and mechanically support, in a rotatable manner, said operating part and said detecting part relative to the data processor as an exclusive support for the pointing device, when said connector part is connected to the data processor.

7. A pointing device as set forth in claim 6, further comprising a housing for accommodating said operating part and said detecting part, said connector part being rotatably coupled to said housing.

8. A pointing device as set forth in claim 6,
wherein said detecting part includes a magneto-electro transducer, wherein said magnet is received by said operating part, and wherein said yoke is arranged adjacent to said magnet on a side remote from said magneto-electro transducer.

9. A pointing device as set forth in claim 6, wherein said yoke is separate from the magnet, has a width greater than the magnet, and is arranged in said operating part to at least partially cover said magnet.

10. A pointing device comprising:
a base part;
an operating part supported on said base part in a rockable manner about a fulcrum;
a magnet carried on one of said base part and said operating part;
a magneto-electro transducer carried on the other of said base part and said operating part;
an elastic member arranged between said base part and said operating part to elastically push said operating part toward an initial balanced position on said base part, said elastic member being formed as a plate spring provided with an opening to receive the fulcrum therethrough, a first section of said elastic member being engageable with said base part and a second section of said elastic member being engageable with said operating part, said second section being integrally joined to said first section and located to extend around said fulcrum,
wherein said first section extends annularly around said fulcrum and is fixedly supported on said base part, and said second section extends arcuately along said first section to exert a spring action, and
wherein said second section includes—
a distal free end engageable with said operating part and a proximal end integrally joined to said first section at a position remote from said distal free end, and has a length between said distal end and said proximal end for exerting the spring action, or
a distal free end engageable with said operating part and a proximal end integrally joined to said first section at a position close to said distal free end, and has a generally U-shaped length between said distal end and said proximal end for exerting the spring action; and
a yoke forming a magnetic path, said yoke being arranged in said operating part to at least partially cover the magnet.

11. A pointing device as set forth in claim 10, wherein said magnet is carried on said operating part, and wherein said yoke is arranged adjacent to said magnet on a side remote from said magneto-electro transducer carried on said base part.

12. A pointing device comprising:
a base part;
an operating part supported on said base part in a rockable manner about a fulcrum;
a magnet carried on one of said base part and said operating part;
a magneto-electro transducer carried on the other of said base part and said operating part;
an elastic member arranged between said base part and said operating part to elastically push said operating part toward an initial balanced position on said base part;
a connector part arranged adjacent to said base part and said operating part, said connector part being detachably connectable to a data processor and serving to electrically and mechanically support, in a rotatable manner, said base part and said operating part relative to the data processor, when said connector part is connected to the data processor; and
a yoke forming a magnetic path, said yoke being arranged in said operating part to at least partially cover the magnet.

13. A pointing device comprising:
an operating part;
a detecting part for detecting a movement of said operating part;
a connector part arranged adjacent to said operating part and said detecting part, said connector part being detachably connectable to a data processor and serving to electrically and mechanically support, in a rotatable manner, said operating part and said detecting part relative to the data processor, when said connector part is connected to the data processor; and
a yoke forming a magnetic path, said yoke being arranged in said operating part to at least partially cover a magnet of the pointing device.

14. A pointing device comprising:
a base part;
an operating part supported on said base part in a rockable manner about a fulcrum;
a magnet carried on one of said base part and said operating part;
a magneto-electro transducer carried on the other of said base part and said operating part;
an elastic member arranged between said base part and said operating part to elastically push said operating part toward an initial balanced position on said base part, said elastic member being formed as a plate spring provided with an opening to receive the fulcrum therethrough, a first section of said elastic member being engageable with said base part and a second section of said elastic member being engageable with said operating part, said second section being integrally joined to said first section and located to extend around said fulcrum,
wherein said first section extends annularly around said fulcrum and is fixedly supported on said base part, and said second section extends arcuately along said first section to exert a spring action, wherein said second section includes—
a distal free end engageable with said operating part and a proximal end integrally joined to said first section at a position remote from said distal free end, and has a length between said distal end and said proximal end for exerting the spring action, or
a distal free end engageable with said operating part and a proximal end integrally joined to said first section at a position close to said distal free end, and has a generally U-shaped length between said distal end and said proximal end for exerting the spring action; and
a yoke separate from a magnet, having a width greater than the magnet, and being arranged in said operating part to at least partially cover said magnet.

* * * * *